(12) United States Patent
Horii et al.

(10) Patent No.: US 9,463,781 B2
(45) Date of Patent: Oct. 11, 2016

(54) STOP CONTROL SYSTEM FOR VEHICLE

(71) Applicant: HONDA MOTOR CO., LTD., Tokyo (JP)

(72) Inventors: Eisuke Horii, Wako (JP); Yoshinari Sugita, Wako (JP); Shinichi Arai, Wako (JP); Syumpei Tahara, Wako (JP); Tomohiro Watanabe, Wako (JP); Hiroshi Yoneguchi, Wako (JP); Masahiko Asakura, Wako (JP); Ryuji Sato, Wako (JP); Takahiro Ohmi, Wako (JP); Hideo Takeuchi, Haga-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/441,854

(22) PCT Filed: Nov. 13, 2012

(86) PCT No.: PCT/JP2012/079359
§ 371 (c)(1),
(2) Date: May 11, 2015

(87) PCT Pub. No.: WO2014/076754
PCT Pub. Date: May 22, 2014

(65) Prior Publication Data
US 2015/0298665 A1    Oct. 22, 2015

(51) Int. Cl.
*B60T 8/17*        (2006.01)
*F02N 11/08*    (2006.01)
(Continued)

(52) U.S. Cl.
CPC .. *B60T 8/17* (2013.01); *B60T 7/12* (2013.01); *B60T 8/172* (2013.01); *B60T 8/245* (2013.01);
(Continued)

(58) Field of Classification Search
CPC ...... B60T 13/588; B60T 13/741; B60T 7/12; B60T 8/17; B60T 8/172; B60T 8/245; F02N 11/0818; F02N 11/0837; F02N 11/084; F02N 2200/0801; F02N 2200/0807; F02N 2200/102; F02N 2200/124; Y02T 10/48
USPC .......... 701/70, 71, 73–75, 78, 83, 84; 477/4, 477/182, 199, 200
See application file for complete search history.

(56) References Cited

U.S. PATENT DOCUMENTS 5,967,628 A * 10/1999 Abe .......................... B60T 7/12
188/353
6,135,920 A * 10/2000 Kamiya ................ B60W 10/18
477/185

(Continued)

FOREIGN PATENT DOCUMENTS

JP    8-295212    11/1996
JP    10-181576    7/1998

(Continued)

OTHER PUBLICATIONS

International Search Report for corresponding International Application No. PCT/JP2012/079359, Feb. 19, 2013.

*Primary Examiner* — Tyler J Lee
(74) *Attorney, Agent, or Firm* — Mori & Ward, LLP (57) ABSTRACT

A stop control system for a vehicle, which is capable of positively preventing movement of a vehicle by positively increasing a braking force of the vehicle during an idle stop. In the stop control system for a vehicle of the present invention, the engine 3 is cranked by a starter motor 6 using power supplied from the battery 7 when restart conditions are satisfied during an idle stop (step 8 in FIG. 5). Further, the stop control system includes a hydraulic pump 55 driven by power supplied from the battery 7, for increasing the braking force of the vehicle V. During a stop of the vehicle V, when it is determined that the braking force of the vehicle V needs to be increased (F_BFREQ=1), the hydraulic pump 55 is activated. Further, if the restart conditions are satisfied during operation of the hydraulic pump 55, the cranking is inhibited to continue the operation of the hydraulic pump 55 (steps 6 to 9 in FIG. 5).

16 Claims, 9 Drawing Sheets

(51) Int. Cl.
  *B60T 7/12* (2006.01)
  *B60T 8/172* (2006.01)
  *B60T 8/24* (2006.01)
  *B60T 13/58* (2006.01)
  *B60T 13/74* (2006.01)

(52) U.S. Cl.
  CPC ............ B60T 13/588 (2013.01); B60T 13/741 (2013.01); F02N 11/084 (2013.01); F02N 11/0818 (2013.01); F02N 11/0837 (2013.01); *F02N 2200/0801* (2013.01); *F02N 2200/0807* (2013.01); *F02N 2200/102* (2013.01); *F02N 2200/124* (2013.01); *Y02T 10/48* (2013.01)

(56) References Cited

U.S. PATENT DOCUMENTS

| | | | | |
|---|---|---|---|---|
| 6,346,064 | B1 * | 2/2002 | Hada | B60K 6/543 477/171 |
| 6,540,644 | B2 * | 4/2003 | Morimoto | F02D 17/04 477/102 |
| 6,547,344 | B2 * | 4/2003 | Hada | B60K 6/543 188/DIG. 2 |
| 6,702,718 | B2 * | 3/2004 | Tani | F02D 41/042 477/203 |
| 7,484,816 | B2 * | 2/2009 | Maruyama | B60T 7/122 303/191 |
| 7,585,250 | B2 * | 9/2009 | Braun | B60T 7/12 477/200 |
| 7,908,071 | B2 * | 3/2011 | Nakayama | B60T 7/122 180/282 |
| 8,326,520 | B2 * | 12/2012 | Bollig | B60W 10/06 123/179.4 |
| 8,998,774 | B2 * | 4/2015 | Yu | F02N 11/0822 477/203 |
| 2004/0231951 | A1 * | 11/2004 | Hasegawa | B60W 10/115 192/220 |
| 2007/0114841 | A1 * | 5/2007 | Maruyama | B60T 7/122 303/89 |
| 2010/0228460 | A1 * | 9/2010 | Saito | B60T 7/12 701/70 |
| 2011/0071001 | A1 * | 3/2011 | Yu | B60K 6/485 477/203 |
| 2011/0256980 | A1 * | 10/2011 | Saito | B60W 10/06 477/183 |
| 2012/0190500 | A1 * | 7/2012 | Yamada | B60T 8/3275 477/184 |
| 2014/0012471 | A1 * | 1/2014 | Nakaso | B60T 7/122 701/51 |
| 2015/0260143 | A1 * | 9/2015 | Yorke | B60T 7/042 701/112 |

FOREIGN PATENT DOCUMENTS

| | | |
|---|---|---|
| JP | 2004-182118 | 7/2004 |
| JP | 2011-143875 | 7/2011 |
| WO | WO 2012/029773 | 3/2012 |

* cited by examiner

STOP CONTROL SYSTEM FOR VEHICLE

TECHNICAL FIELD

The present invention relates to a stop control system for a vehicle, which automatically stops and restarts an internal combustion engine during a stop of the vehicle, and controls the braking force of the vehicle such that it is increased.

BACKGROUND ART

Conventionally, as a stop control system for a vehicle of this type, there has been known one disclosed in PTL 1. An internal combustion engine installed on this vehicle is of a so-called idle-stop type, which is stopped when predetermined stop conditions are satisfied, and thereafter is restarted when predetermined restart conditions are satisfied. The vehicle includes a brake system for braking the vehicle during normal operation, and further includes a hydraulic pump for increasing the braking force during a stop of the vehicle.

This brake system has a master cylinder that generates a brake fluid pressure according to a stepping-on operation of a brake pedal, using negative pressure in an intake pipe, and brake units each provided for each wheel and having a wheel cylinder. The brake system brakes the vehicle by supplying the brake fluid pressure generated in the master cylinder to the wheel cylinder via a hydraulic circuit. The hydraulic pump is provided in the middle of the hydraulic circuit, and is driven by a motor.

In this stop control system, when restart conditions, including e.g. release of the stepping-on of a foot brake, are satisfied during an automatic stop of the engine, the engine is cranked by supplying power from a battery to a starter motor. During the cranking, power required for cranking is secured by inhibiting the operation of the hydraulic pump performed by the motor. Further, when a failure of cranking for the restart is detected and also the foot brake is stepped on, the hydraulic pump is driven by supplying power from the battery to the motor to thereby increase the brake fluid pressure in the wheel cylinder and the braking force of the vehicle, whereby the movement of the vehicle during the stop is prevented.

CITATION LIST

Patent Literature

[PTL 1]
Japanese Laid-Open Patent Publication (Kokai) No. 2011-143875

SUMMARY OF INVENTION

Technical Problem

As described above, in the conventional stop control system, when restart conditions are satisfied during an idle stop, cranking is preferentially performed, and the operation of the hydraulic pump for increasing the braking force of the vehicle is inhibited during this cranking. Therefore, during cranking, the braking force of the vehicle is lowered and becomes insufficient, which may cause the vehicle during the stop to be moved, so that it is impossible to sufficiently achieve the safety of the vehicle.

The present invention has been made to provide a solution to the above-described problems, and an object thereof is to provide a stop control system for a vehicle, which is capable of positively increasing, during an idle stop, the braking force of the vehicle, and thereby positively preventing the movement of the vehicle during the stop.

Solution to Problem

Figure 5:
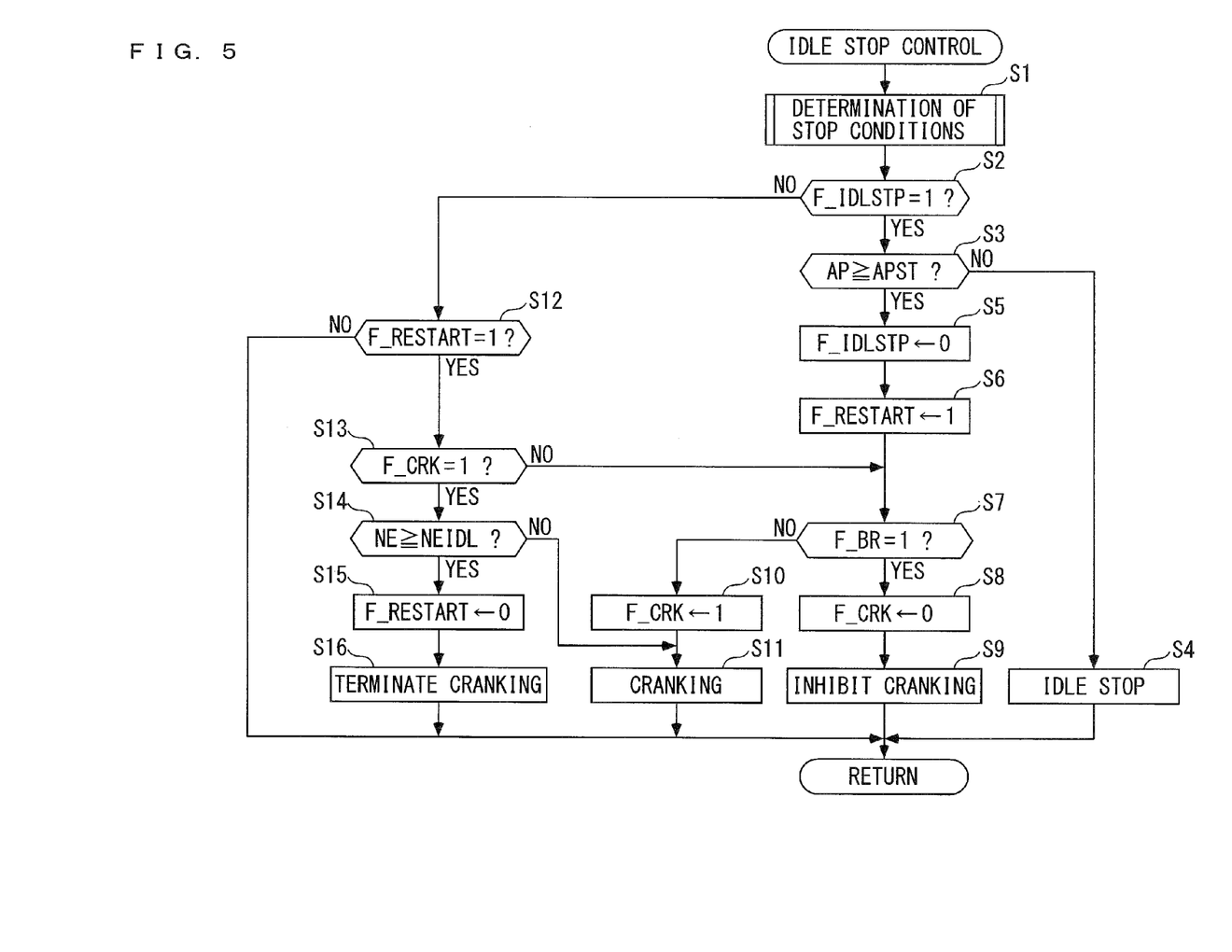
FIG. 5 A flowchart of an idle stop control process.

To attain the above object, the invention according to claim 1 is a stop control system 3 for a vehicle V, for stopping an internal combustion engine 3 installed on the vehicle having a brake system 5, when predetermined stop conditions are satisfied, restarting the engine 3 when predetermined restart conditions are satisfied, and controlling a braking force of the vehicle V such that the braking force is increased in order to supplement the braking force of the brake system 5 during a stop of the vehicle V, comprising cranking means (starter motor 6) for cranking the engine 3 using power supplied from a predetermined power source (battery 7 in an embodiment (the same applies hereinafter in this section)) when the restart conditions are satisfied, a braking force-increasing device (hydraulic pump 55, electric brake 20) that is driven by power supplied from the power source, for increasing the braking force of the vehicle V, braking force increasing necessity-determining means (ECU 2, FIG. 6) for determining whether or not the braking force of the vehicle V needs to be increased by the braking force-increasing device during a stop of the vehicle, and control means (ECU 2, steps 34, 38 in FIG. 8) for causing the braking force-increasing device to operate, when it is determined that the braking force of the vehicle V needs to be increased, wherein the control means inhibits the cranking when the restart conditions are satisfied during operation of the braking force-increasing device (steps 6 to 9 in FIG. 5).

The engine is installed on the vehicle, and is of a so-called idle-stop type that is automatically stopped when predetermined stop conditions are satisfied, and is thereafter automatically restarted when predetermined restart conditions are satisfied. When the above-mentioned restart conditions are satisfied, the engine is cranked by the cranking means using power supplied from the predetermined power source, so as to restart the engine.

Further, the stop control system according to the present invention includes a braking force-increasing device that is driven by power supplied from the power source which is common to the cranking means, and if it is determined that the braking force of the vehicle needs to be increased by the braking force-increasing device during a stop of the vehicle, the braking force-increasing device is activated. Further, in a case where the restart conditions are satisfied during operation of the braking force-increasing device, the cranking is inhibited.

Thus, when restart conditions from the idle stop state are satisfied during operation of the braking force-increasing device, cranking is inhibited to continue the operation of the braking force-increasing device. This makes it possible to prevent the voltage from being lowered due to the cranking to thereby ensure a stable operation of the braking force-increasing device, whereby it is possible to positively increase the braking force of the vehicle and hence positively prevent the vehicle during a stop from moving. Further, the braking force-increasing device is activated only when it is determined that the braking force of the vehicle needs to be increased, which makes it possible to efficiently perform the operation of the braking force-increasing device without wasting the power.

Figure 8:
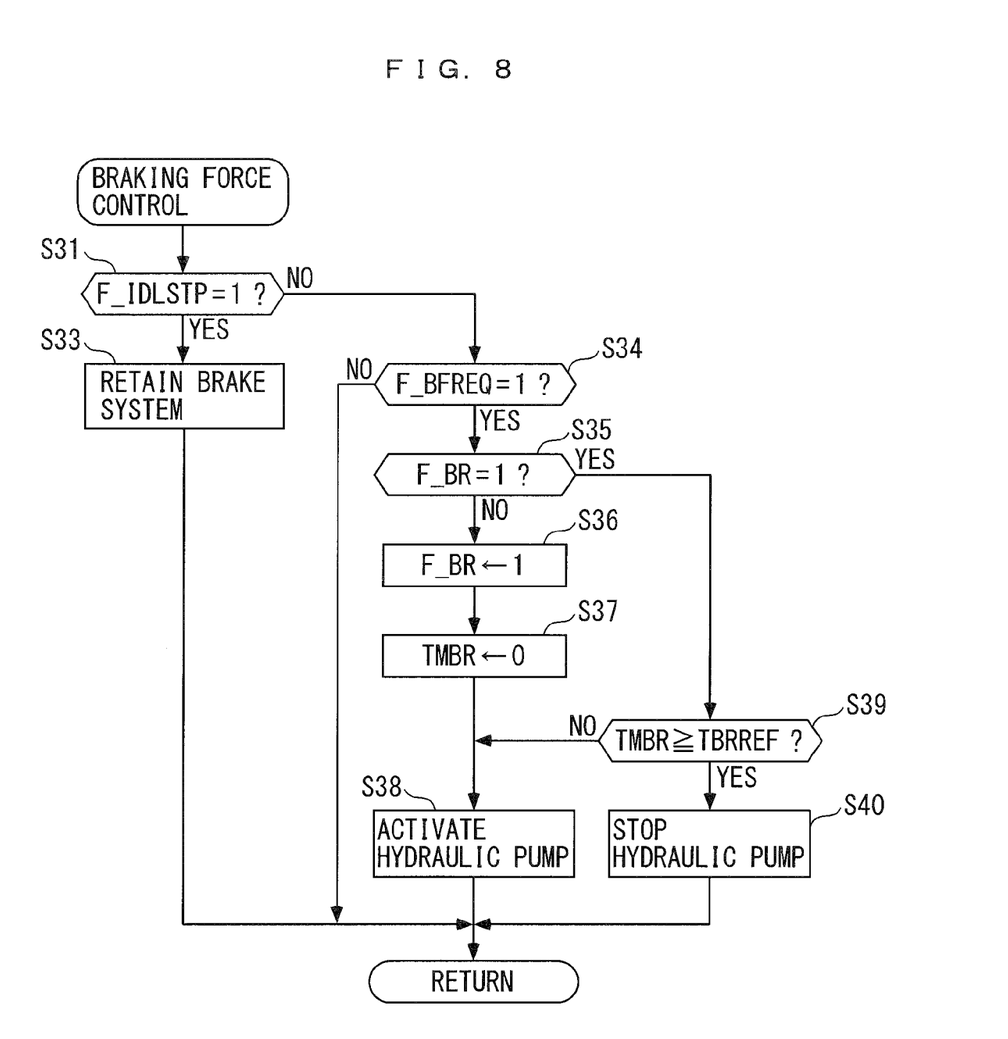
FIG. 8 A flowchart of a braking force control process according to an embodiment.

The invention according to claim 2 is the stop control system according to claim 1, wherein the control means inhibits the cranking until the operation of the braking force-increasing device is terminated, and causes the cranking to be started when the operation of the braking force-increasing device is terminated (steps 7 to 11 in FIG. 8).

With this configuration, it is possible to ensure a more stable operation of the braking force-increasing device by inhibiting the cranking until the operation of the braking force-increasing device is terminated. Further, it is possible to start the cranking as quickly as possible by starting the cranking when the operation of the braking force-increasing device is terminated, and thereby restart the engine without any difficulty.

The invention according to claim 3 is the stop control system according to claim 1 or 2, wherein the control means stops the braking force-increasing device when a predetermined time period elapses after starting the operation of the braking force-increasing device (steps 39, 40 in FIG. 8).

With this configuration, the braking force-increasing device is operated for the predetermined time period, whereby the operation time thereof is sufficiently secured. Therefore, it is possible to positively increase the braking force of the vehicle.

The invention according to claim 4 is the stop control system according to claim 3, further comprising road surface slope-detecting means (acceleration sensor 67) for detecting a slope ASLP of a road surface on which the vehicle V is stopped, and predetermined time period-setting means (ECU 2) for setting the predetermined time period TBRREF according to the detected slope ASLP of the road surface.

The mobility of the vehicle during an idle stop is different depending on the slope of a road surface on which the vehicle is stopped. As the slope of the road surface is larger, the mobility of the vehicle becomes higher. With the above configuration, a predetermined time period that determines an actual operation time period of the braking force-increasing device is set according to the detected slope of the road surface. Therefore, it is possible to operate the braking force-increasing device for an appropriate time period according to the mobility of the vehicle dependent on the slope of the road surface.

Figure 6:
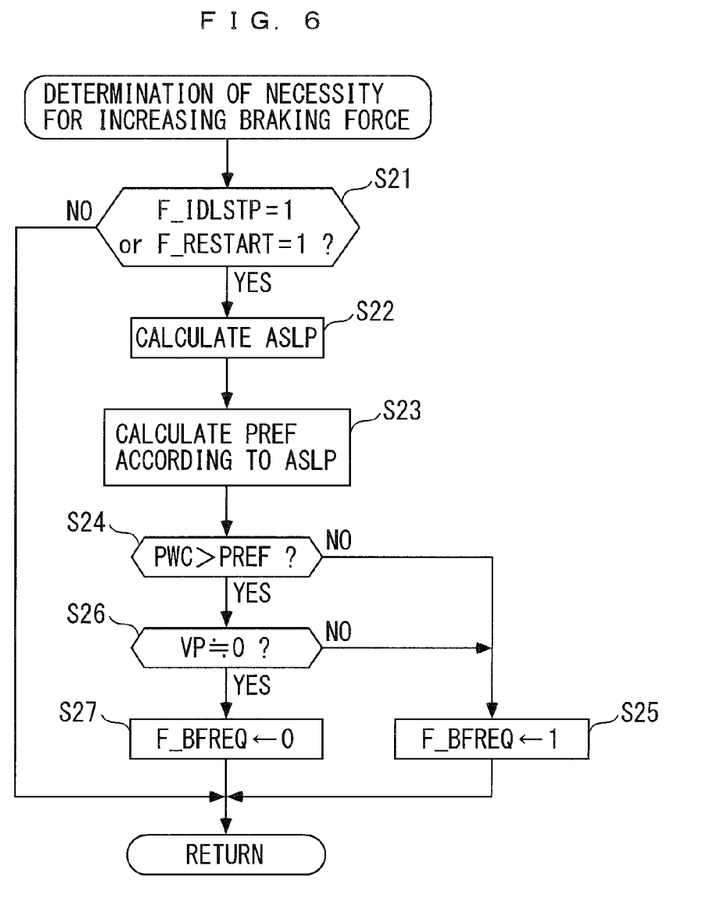
FIG. 6 A flowchart of a braking force-increasing necessity determination process for a vehicle.

The invention according to claim 5 is the stop control system according to any one of claims 1 to 4, wherein the brake system 5 is configured to brake the vehicle V by a brake fluid pressure that is supplied to a wheel cylinder 16, the stop control system further comprising wheel cylinder pressure-detecting means (wheel cylinder pressure sensor 62) for detecting the brake fluid pressure in the wheel cylinder (wheel cylinder pressure PWC), and wherein the braking force increasing necessity-determining means determines that the braking force needs to be increased by the braking force-increasing device when the detected brake fluid pressure in the wheel cylinder has lowered to not higher than a predetermined pressure PREF (steps 24, 25 in FIG. 6).

With this configuration, the brake system is configured to brake the vehicle by the brake fluid pressure that is supplied to the wheel cylinder, and it is determined that the braking force needs to be increased by the braking force-increasing device when the detected brake fluid pressure in the wheel cylinder has lowered to not higher than a predetermined pressure. This makes it possible to properly operate the braking force-increasing device according to the actual lowered state of the brake fluid pressure in the wheel cylinder that drives the brake system, and efficiently obtain a required braking force.

Figure 10:
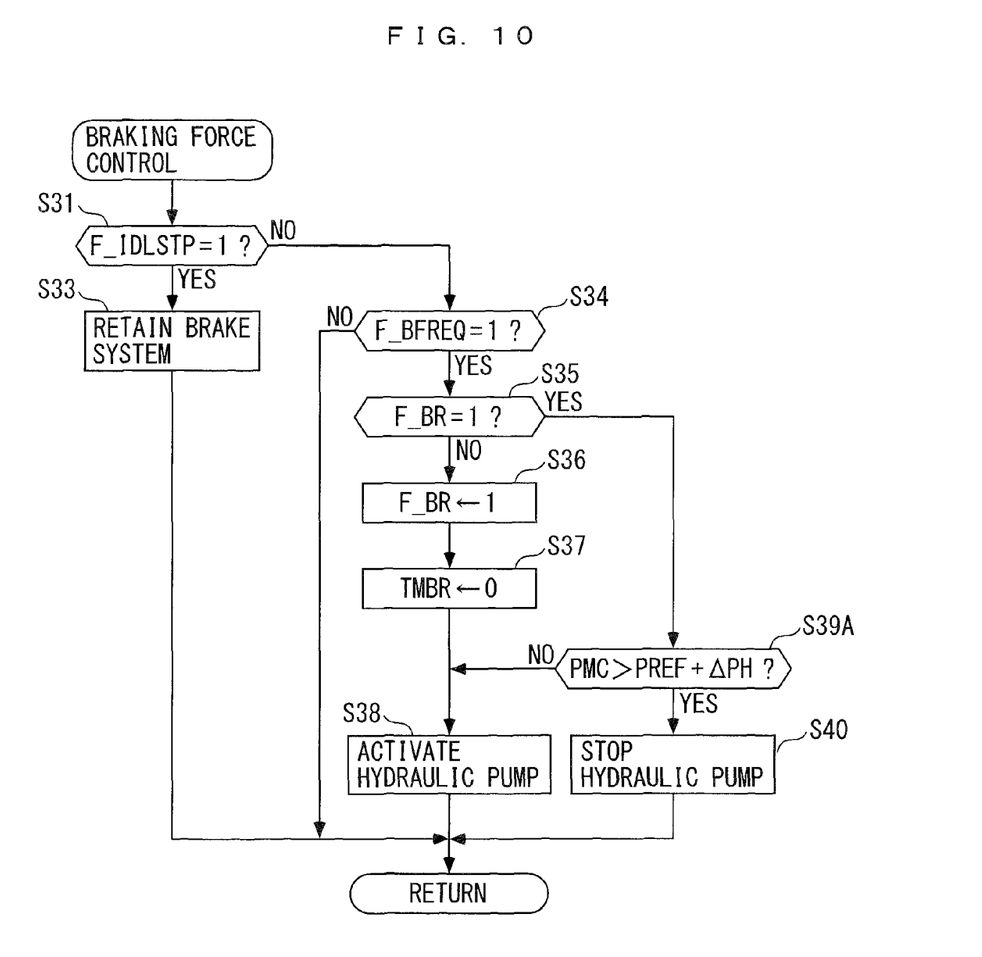
FIG. 10 A flowchart of a braking force control process according to a variation of the embodiment.

The invention according to claim 6 is the stop control system according to claim 5, wherein the control means stops the braking force-increasing device when the brake fluid pressure in the wheel cylinder 16 exceeds the predetermined pressure PREF after activating the braking force-increasing device (steps 39A, 40 in FIG. 10).

With this configuration, after activating the braking force-increasing device, it is possible to stop the braking force-increasing device in a state where the brake fluid pressure in the wheel cylinder has actually and sufficiently recovered, and therefore, it is possible to positively increase the braking force of the vehicle, and efficiently operate the braking force-increasing device The invention according to claim 7 is the stop control system according to claim 5 or 6, further comprising road surface slope-detecting means (acceleration sensor 67) for detecting a slope ASLP of a road surface on which the vehicle V is stopped, and predetermined pressure-setting means (ECU 2, step 23 in FIG. 6, FIG. 7) for setting a predetermined pressure PREF according to the detected slope ASLP of the road surface.

The mobility of the vehicle during an idle stop is different depending on the slope of a road surface on which the vehicle is stopped. As the slope of the road surface is larger, the mobility of the vehicle becomes higher. With the above configuration, the predetermined pressure for determining whether or not the braking force-increasing device can be activated or stopped is set according to the detected slope of the road surface. Therefore, it is possible to properly control the activation or stop of the braking force-increasing device according to the mobility of the vehicle, based on a result of comparison between the brake fluid pressure in the wheel cylinder and the set predetermined pressure.

The invention according to claim 8 is the stop control system according to any one of claims 1 to 4, further comprising vehicle speed-detecting means (wheel speed sensor 64) for detecting a speed of the vehicle V (vehicle speed VP), and the braking force increasing necessity-determining means determines that the braking force needs to be increased by the braking force-increasing device, when the detected speed of the vehicle is not equal to 0 (steps 26, 25 in FIG. 6).

With this configuration, it is determined that the braking force needs to be increased by the braking force-increasing device when the detected speed of the vehicle is not equal to 0, and hence it is possible to operate the braking force-increasing device according to even slight movement of the vehicle, and more positively prevent the vehicle from further moving. Further, since the vehicle speed-detecting means is normally provided for controlling the vehicle or the engine, it is possible to obtain the above-described advantageous effects using such an existing device without causing an increase in the manufacturing costs.

DESCRIPTION OF EMBODIMENTS

Figure 1:
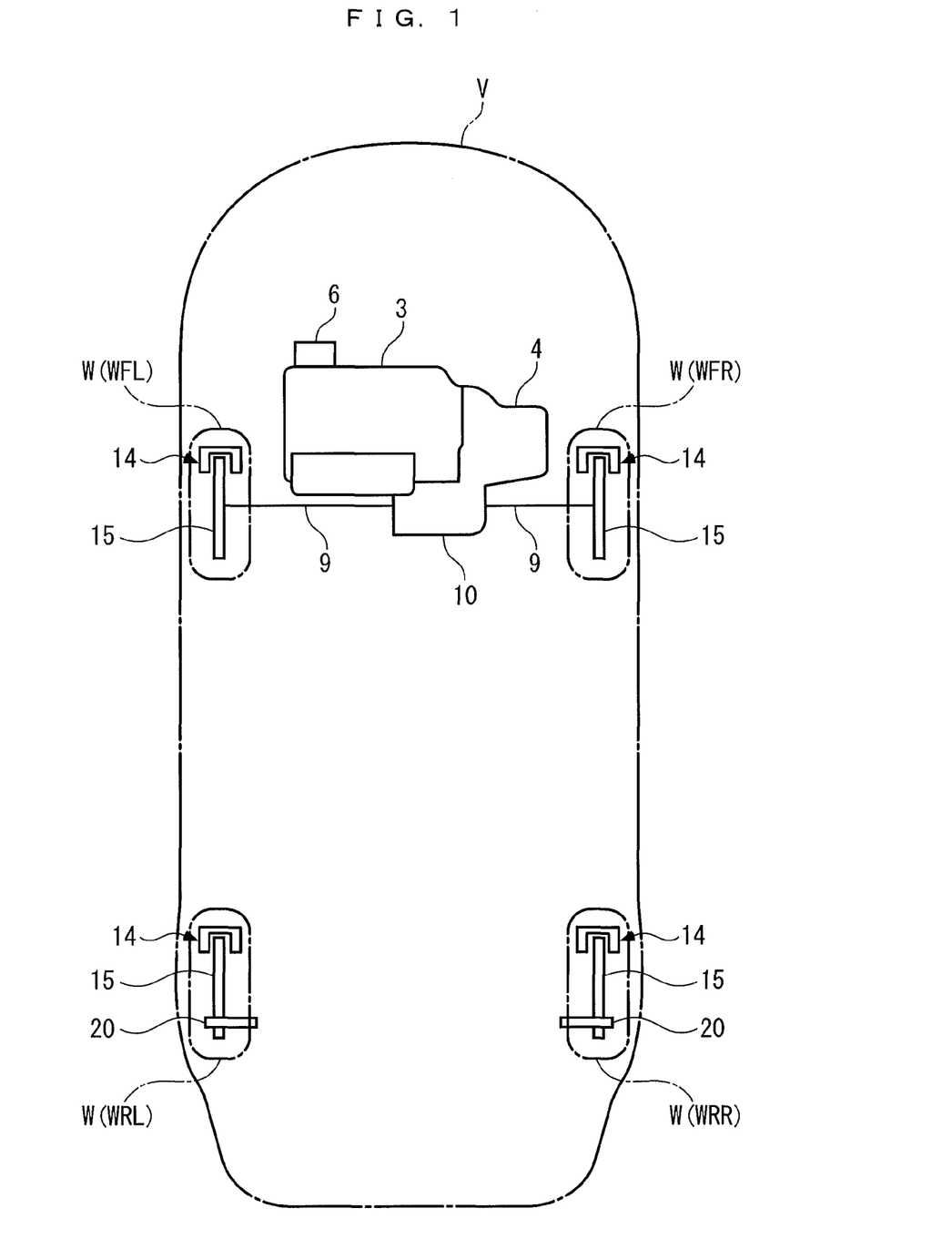
FIG. 1 A diagram schematically showing a vehicle to which the present invention is applied.

The invention will now be described in detail with reference to the drawings showing a preferred embodiment thereof. FIG. 1 schematically shows a vehicle V to which the present invention is applied. As shown in the FIG. 1, the vehicle V is a four-wheel vehicle of front-wheel drive type, which has left and right front wheels WFL and WFR and left and right rear wheels WRL and WRR (hereinafter referred to as "the wheels W", when generically referred to), and includes an internal combustion engine (hereinafter referred to as "the engine") 3 installed on the front part of the vehicle V, an automatic transmission 4 for changing speed of power from the engine 3, and a brake system 5 (see FIG. 3) for braking the vehicle V.

The engine 3 is a gasoline engine that performs, as described hereinafter, a so-called idle-stop for automatically stopping the engine 3 when predetermined stop conditions are satisfied and automatically restarting the same when predetermined restart conditions are satisfied. Further, the restart of the engine 3 is performed by driving a starter motor 6 using power supplied from a battery 7 (see FIG. 4) to thereby rotate (crank) the crankshaft (not shown), and injecting fuel from fuel injection valves 8.

The automatic transmission 4 is comprised of a torque converter that is connected to the crankshaft of the engine 3, a shift lever with which one of eight shift positions of 1, 2, 3, D4, D5, N, R, and P can be selected, and a gear mechanism with which it is possible to switch between one of the six speed positions of first to fifth speeds and reverse can be switched (none of which are shown). An output shaft (not shown) of the torque converter of the automatic transmission 4 is connected to the left and right front wheels WFL and WFR via a final reduction gear unit 10 and drive shafts 9 and 9, whereby the power of the engine 3 is transmitted to the front wheels WFL and WFR.

Figure 3:
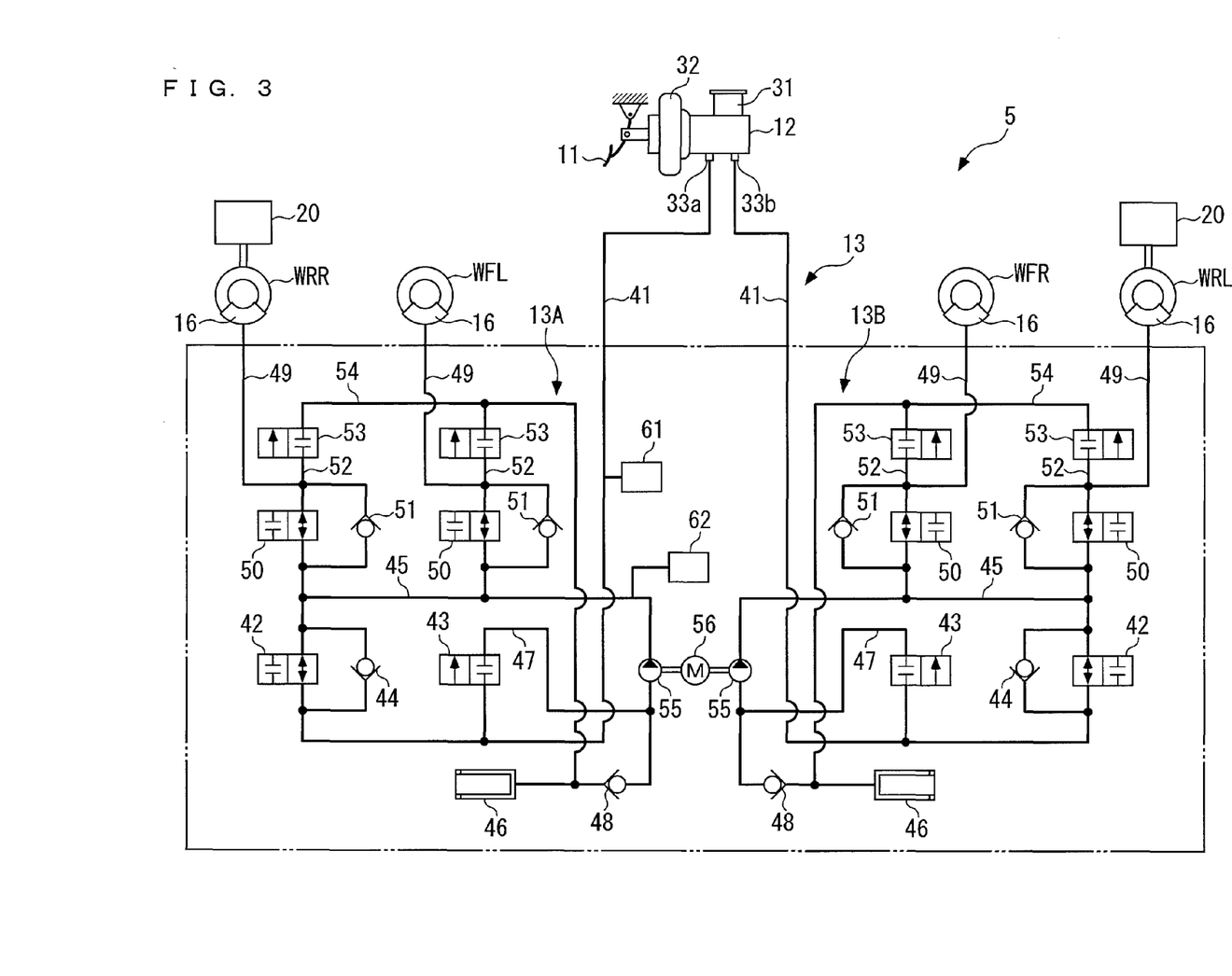
FIG. 3 A circuit diagram showing a configuration of a brake system.

As shown in FIG. 3, the brake system 5 is of a hydraulic type using brake fluid such as hydraulic oil, and is comprised of a brake pedal 11, a master cylinder 12, a hydraulic circuit 13, and a disc brake 14 provided for each wheel W. The disc brake 14 includes a disc 15 (see FIG. 1) integrally formed with the wheel W, a pair of movable brake pads (not shown) disposed on both sides of the disc 15, a piston (not shown) for driving the brake pads, and a wheel cylinder 16. When the brake pedal 11 is stepped on by a driver of the vehicle V, by supplying the brake fluid pressure generated in the master cylinder 12 to the wheel cylinder 16 via the brake circuit 13, the brake pads are driven to hold the disc 15 therebetween, whereby the vehicle V is braked. A detailed description of the configuration and operation of the brake system 5 will be given hereinafter.

Figure 2:
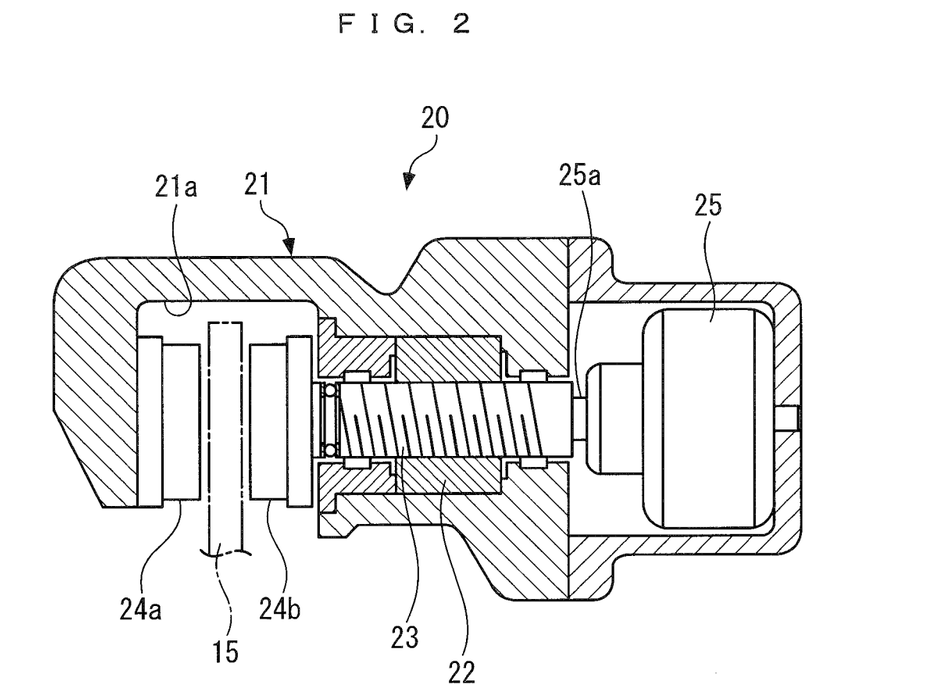
FIG. 2 A cross-sectional view showing a schematic configuration of an electric brake.

Further, the left and right rear wheels WRL and WRR are provided with respective electric brakes 20 separately from the above-described brake system 5. As shown in FIG. 2, the electric brake 20 includes a caliper body 21 integrally formed with a body (not shown) of the vehicle V, a nut 22 fixed in the caliper body 21, a screw 23 screwed in the nut 22 and movable in the axial direction, a pair of brake pads 24a and 24b housed in a recess 21a of the caliper body 21, and a brake motor 25 having a rotating shaft 25a being connected to one end of the screw 23. One brake pad 24a is secured to the wall surface of the recess 21a, the other brake pad 24b is attached to the other end of the screw 23, and the disc 15 of the disc brake 14 is disposed between the brake pads 24a and 24b.

With the above-described configuration, when the brake motor 25 performs normal rotation, the screw 23 is moved toward the disc 15 while rotating, whereby the brake pad 24b is moved together therewith to hold the disc 15 with the brake pad 24a, whereby the rear wheels WRL and WRR are braked. When the brake motor 25 performs reverse rotation from this state, by action reverse to the above, the brake pad 24b is moved toward the brake motor 25 to leave the disc 15, whereby the braking of the rear wheels WRL and WRR is released. Such operations of the electric brake 20 are performed according to the operating state of an electric brake switch (not shown) provided in the driver's seat of the vehicle V, and are controlled by a control signal from an ECU 2, described hereinafter.

Next, referring to FIG. 3, the configuration of the above-described brake system 5 will be described in detail. The master cylinders 12 of the brake system 5 are of a tandem type, each having two hydraulic chambers and pistons (none of which are shown). The brake fluid is supplied from a reservoir 31 to each hydraulic chamber, and one piston is connected to the brake pedal 11. Further, a brake booster 32 is provided between the brake pedal 11 and the master cylinder 12. The brake booster 32 generates an assist force that acts on the piston using negative pressure generated in the intake pipe during operation of the engine 3, to thereby assist the operating force of the brake pedal 11.

When the brake pedal 11 is operated, two pistons are moved to pressurize the brake fluid in each hydraulic chamber, whereby the brake fluid pressure is generated according to the operating force of the brake pedal 11 assisted by the brake booster 32, and is output from a first output port 33a and a second output port 33b that are communicated with respective hydraulic chambers.

The hydraulic circuit 13 of the brake system 5 is comprised of a first hydraulic circuit 13A that is linked between the first output port 33a and the wheel cylinders 16 and 16 of the left front wheel WFL and the right rear wheel WRR, and a second hydraulic circuit 13B that is linked between the second output port 33b and the wheel cylinders 16 and 16 of the right front wheel WFR and the left rear wheel WRL.

These two-system hydraulic circuits 13A and 13B have the same configuration with each other, and hence the following description is given of the first hydraulic circuit 13A, by way of example. Further, in the following description, when "upstream" is mentioned concerning various fluid lines described hereinafter, it means a side toward the master cylinder 12 and when "downstream" is mentioned concerning the same, it means a side toward the wheel cylinder 16.

A first fluid line 41 is connected to the first output port 33a of the master cylinder 12. A first control valve 42 and a second control valve 43 for VSA (Vehicle Stability Assist) are disposed in parallel with each other at respective locations downstream of the first fluid line 41, and further, the first control valve 42 is provided with a check valve 44 disposed in parallel therewith.

The first control valve 42 is formed by a normally-open solenoid valve that allows bidirectional flow of the brake fluid, and is connected to the reservoir 46 downstream thereof via a second fluid line 45. The check valve 44 is so disposed as to allow flow of the brake fluid from upstream to downstream of the first control valve 42.

The second control valve 43 is formed by a normally-closed solenoid valve that allows flow of the brake fluid only from upstream thereof, and is connected downstream to the second fluid line 45 via a third fluid line 47. Further, the second fluid line 45 is provided with a check valve 48 at a location closer to a reservoir 46 than to a portion thereof connected to the third fluid line 47, which allows flow of the brake fluid from the reservoir 46.

Two fourth fluid lines 49 and 49 are connected to the above-described second fluid line 45 in parallel with each other, and these fourth fluid lines 49 and 49 are connected to the wheel cylinders 16 and 16 of the left front wheel WFL and the right rear wheel WRR, respectively. Each fourth fluid line 49 is provided with an inflow valve 50 and a check valve 51 that are disposed in parallel with each other. The inflow valve 50 is formed by a normally-open solenoid valve that allows bidirectional flow of the brake fluid. Further, the check valve 51 is so disposed as to allow flow of the brake fluid from downstream to upstream of the inflow valve 50.

Further, a fifth fluid line 52 branches from a portion of each fourth fluid line 49, which is downstream of the inflow valve 50, and each fifth fluid line 52 is provided with an outflow valve 53. The outflow valve 53 is formed by a normally-closed solenoid valve that allows flow of the brake fluid only from the inflow valve 50. The fifth fluid lines 52 and 52 join a sixth fluid line 54, and the sixth fluid line 54 is connected to a portion of the second fluid line 45, which is closer to the reservoir 46 than to the check valve 48.

The second fluid line 45 is provided with a hydraulic pump 55 at a location remoter from the reservoir 46 than the portion thereof connected to the third fluid line 47 is, and the hydraulic pump 55 is connected to a hydraulic motor 56. The hydraulic motor 56 is driven by power supplied from the battery 7 based on a drive signal from the ECU 2, whereby the hydraulic pump 55 is driven.

Next, a basic operation of the brake system 5 configured as above will be described. In a state in which the vehicle V and the engine 3 are normally operate, the brake system 5 is controlled to a normal operation mode shown in FIG. 3. That is, all the first control valves 42, second control valves 43, inflow valves 50, and outflow valves 53 of the brake system 5 are controlled to a non-excited state, and the hydraulic motor 56 and the hydraulic pump 55 are at rest.

In this normal operation mode, when the brake pedal 11 is stepped on, a brake fluid pressure (master cylinder pressure PMC) that is pressurized according to the sum of the operating force of the brake pedal 11 and the assist force of the brake booster 32 is generated in the master cylinder 12. This brake fluid pressure is output from the first and second output ports 33a and 33b to each first fluid line 41 of the first and second hydraulic circuits 13A and 13B, and is supplied to the wheel cylinder 16 of each wheel W further via the first control valve 42, the inflow valve 50, and the fourth fluid line 49. Thus, the disc brake 14 of each wheel W is operated to brake the vehicle V with the braking force commensurate with a wheel cylinder pressure PWC.

Further, to increase the braking force of the vehicle V, from the controlled state in the normal mode, the first control valve 42 is excited to be closed, the second control valve 43 is excited to be opened, and the hydraulic motor 56 is driven to operate the hydraulic pump 55 (pressurization mode). In this pressurization mode, the brake fluid is pumped by the hydraulic pump 55 from the reservoir 46 and is pressurized, and the pressurized brake fluid is supplied to the wheel cylinder 16 via the second fluid line 45, the inflow valve 50, and the fourth fluid line 49. This increases the wheel cylinder pressure PWC, whereby the braking force of the vehicle V is increased.

Further, after the above-described pressurization mode and the like, to retain the braking force of the vehicle V, from the controlled state in the pressurization mode, the second control valve 43 is changed into a non-excited state to cause the same to be closed (retention mode). In this retention mode, the first fluid line 41 communicating with the master cylinder 12 is closed by the first control valve 42, and the brake fluid returning from the second fluid line 45 to the reservoir 46 is blocked by the check valve 48 so that outflow of the brake fluid from the wheel cylinder 16 is prevented. This retains the wheel cylinder pressure PWC and the braking force of the vehicle V. Note that the retention mode is released at the standing start of the vehicle V, and the brake system 5 returns to the above-described normal operation mode.

Further, to perform various controls including control of the above-described brake system 5, sensors for detecting operating conditions of the vehicle V and the engine 3 are provided as follows: First, the first fluid line 41 is provided with a master cylinder pressure sensor 61 for detecting the master cylinder pressure PMC and the second fluid line 45 is provided with a wheel cylinder pressure sensor 62 for detecting the wheel cylinder pressure PWC, to deliver signals indicative of respective detections to the ECU 2 (see FIG. 4).

Figure 4:
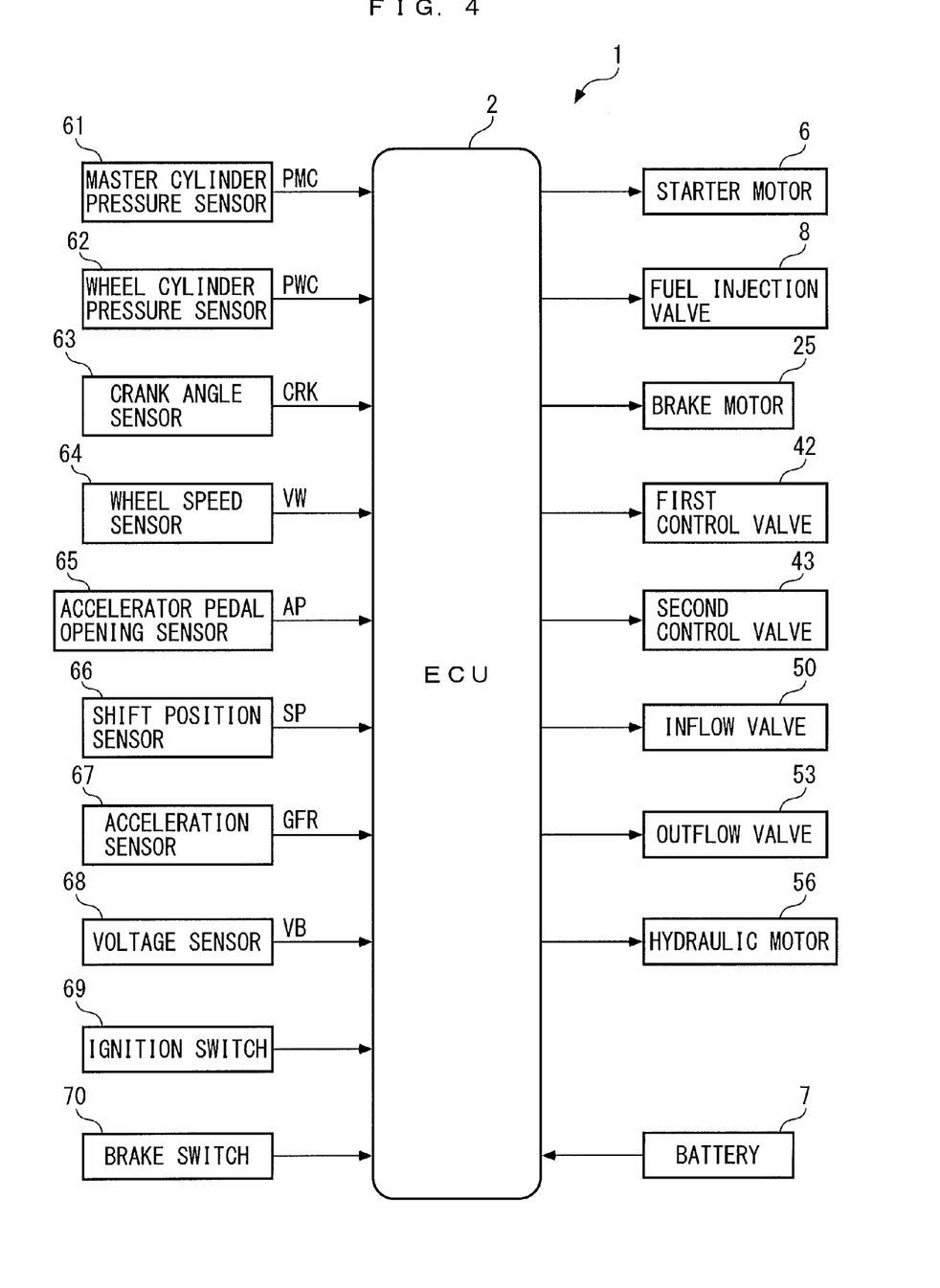
FIG. 4 A block diagram showing a stop control system for a vehicle.

Further, as shown in FIG. 4, a CRK signal indicative of the rotational speed of the crankshaft of the engine 3 from a crank angle sensor 63 and a VW signal indicative of the rotational speed of each wheel W from a wheel speed sensor 64 are input to the ECU 2. The ECU 2 calculates a rotational speed of the engine 3 (hereinafter referred to as "the engine speed NE") based on the CRK signal, and a vehicle speed VP that is the speed of the vehicle V, based on the VW signal.

Further, input to the ECU 2 are a detection signal indicative of an accelerator pedal opening degree AP of the accelerator pedal (not shown) (hereinafter referred to as "the accelerator pedal opening AP") from an accelerator pedal opening sensor 65, a detection signal indicative of a shift position SP of the shift lever from a shift position sensor 66, and a detection signal indicative of a forward-rearward acceleration GFR of the vehicle V from an acceleration sensor 67.

Further, a detection signal indicative of a voltage VB of the battery 7 (hereinafter referred to as "the battery voltage VB") is input from a voltage sensor 68 to the ECU 2. The ECU 2 calculates a remaining charge amount SOC of the battery 7 (hereinafter referred to as "the battery remaining charge SOC") based on this detection signal and so forth.

Further, from an ignition switch 69, a detection signal indicative of an on/off state of the same, and from a brake switch 70, a detection signal indicative of an on/off state of the same, are input to the ECU 2.

The ECU 2 is implemented by a microcomputer comprised of a CPU, a RAM, a ROM, and an input interface (none of which are shown). The ECU 2 determines the operating conditions of the engine 3 and the vehicle V based on a control program stored in the ROM or the like according to the detection signals from the above-mentioned various sensors 61 to 68 and switches 69 and 70, and performs various control processes including control of the braking force of the engine 3 and the vehicle V, based on results of the determination.

More specifically, the ECU 2 controls the starter motor 6 and the fuel injection valve 8 to thereby perform idle stop control of the engine 3. Further, the ECU 2 controls excitation/non-excitation of the first control valve 42, the second control valve 43, the inflow valve 50, and the outflow valve 53, each formed by an electromagnetic valve, of the brake system 5, separately, and performs control of the braking force of the vehicle V by controlling the hydraulic pump 55 and the electric brake 20 via the hydraulic motor 56 and the brake motor 25, respectively.

In the present embodiment, the ECU 2 corresponds to braking force increasing necessity-determining means, control means, predetermined time period-setting means, and predetermined pressure-setting means.

Next, control processes performed by the ECU 2 will be described with reference to FIGS. 5 to 10. The idle stop control process shown in FIG. 5 is for controlling the idle stop and subsequent restart of the engine 3, and is performed at predetermined time intervals.

In the present process, first, in a step 1 (shown as S1; the following steps are also similarly shown), it is determined whether or not the predetermined stop conditions of the engine 3 are satisfied. The stop conditions are a plurality of conditions (a) to (g) described below:

(a) the ignition switch 69 is in the on state;

(b) the engine speed NE is not lower than a predetermined value;

(c) the vehicle speed VP is not higher than a predetermined value;

(d) the accelerator pedal opening AP is approximately equal to 0;

(e) the shift position SP is at a position other than P, R, and N;

(f) the brake switch 70 is in the on state; and (g) the battery remaining charge SOC is not less than a predetermined value.

If all these conditions (a) to (g) are satisfied, it is determined that the stop conditions are satisfied, and an idle-stop flag F_IDLSTP is set to 1. On the other hand, if any one of these conditions (a) to (g) is not satisfied, it is determined that the stop conditions are not satisfied, and the idle-stop flag F_IDLSTP is set to 0.

Next, in a step 2, it is determined whether or not the above idle-stop flag F_IDLSTP is equal to 1. If the answer to the question of the step 2 is affirmative (YES), it is determined whether or not the accelerator pedal opening AP is not smaller than a predetermined restart determining opening degree APST (step 3). If the answer to the question of the step 3 is negative (NO), injection of fuel from the fuel injection valves 8 is stopped to control the engine 3 to an operation stop state, whereby the idle stop is performed (step 4).

On the other hand, if the answer to the question of the step 3 is affirmative (YES), i.e. when the accelerator pedal is stepped on during the idle stop and thereby makes the accelerator pedal opening AP not smaller than the restart determining opening degree APST, it is determined that the restart conditions of the engine 3 are satisfied, so that an idle-stop flag F_IDLSTP is reset to 0 (step 5), and a restart flag F_RESTART is set to 1 (step 6).

Next, it is determined whether or not a hydraulic pump operation flag F_BR is equal to 1 (step 7). In a braking force control process in FIG. 8 described hereinafter, the hydraulic pump operation flag F_BR is set to 1 when the hydraulic pump 55 is in operation for increasing the braking force of the vehicle V. If the answer to the question of the step 7 is affirmative (YES), i.e. if the hydraulic pump 55 is in operation, a cranking flag F_CRK is set to 0 (step 8), and the cranking is inhibited (step 9), followed by terminating the present process. Thus, if the restart conditions are satisfied when the hydraulic pump 55 is in operation, the cranking is inhibited.

On the other hand, if the answer to the question of the step 7 is negative (NO), i.e. if the hydraulic pump 55 is not in operation, the cranking flag F_CRK is set to 1 (step 10), and the cranking is performed (step 11), followed by terminating the present process.

After the restart conditions are satisfied as described above, the answer to the question of the step 2 becomes negative (NO), and in this case, the process proceeds to a step 12, wherein it is determined whether or not the restart flag F_RESTART is equal to 1. After the restart conditions are satisfied, the answer to the question of the step 12 becomes affirmative (YES), and in this case, it is determined whether or not the cranking flag F_CRK is equal to 1 (step 13).

If the answer to the question of the step 13 is negative (NO), i.e. if the cranking is inhibited, the process proceeds to the steps 7 et seq. That is, if the answer to the question of the step 7 is affirmative (YES (F_BR=1)), i.e. if the operation of the hydraulic pump 55 has not been terminated, the cranking-inhibited state is maintained by performing the steps 8 and 9. On the other hand, if the answer to the question of the step 7 is negative (NO (F_BR=0)), i.e. if the operation of the hydraulic pump 55 has been terminated, the cranking-inhibited state is cancelled by performing the steps 10 and 11, wherein the cranking flag F_CRK is set to 1, and the cranking is started, respectively.

In a case where the cranking has not been inhibited, or after the cranking-inhibited state is cancelled as described above, the answer to the question of the step 13 becomes affirmative (YES). In this case, the process proceeds to a step 14, wherein it is determined whether or not the engine speed NE is not lower than an idle speed NEIDL. If the answer to the question of the step 14 is negative (NO), i.e. NE<NEIDL, the process proceeds to the step 11 to continue the cranking.

On the other hand, if the answer to the question of the step 14 is affirmative (YES), i.e. if the engine speed NE becomes not lower than the idle speed NEIDL by cranking, it is determined that the restart is completed, so that the restart flag F_RESTART is reset to 0 (step 15) and the cranking is terminated (step 16), followed by terminating the present process. After the restart of the engine is thus completed, the answer to the question of the step 12 becomes negative (NO), and hence the present process is immediately terminated.

Next, a braking force-increasing necessity determination process for the vehicle V will be described with reference to FIG. 6. This process determines whether or not the braking force needs to be increased e.g. by the operation of the hydraulic pump 55 in order to compensate for the shortage of the braking force of the brake system 5 during an idle stop or a restart of the engine 3, and is executed at predetermined time intervals.

In the present process, first, in a step 21, it is determined whether or not the idle-stop flag F_IDLSTP or the restart flag F_RESTART is equal to 1. If the answer to the question of the step 21 is negative (NO), i.e. if the engine 3 is neither in idle stop nor being restarted, the present process is immediately terminated.

If the answer to the question of the step 21 is affirmative (YES), i.e. if the engine 3 is either in idle stop or being restarted, a slope ASLP of the road surface on which the vehicle V is stopped at the time is calculated (step 22). The calculation of the road surface slope ASLP is performed based on the forward-rearward acceleration GFR detected by the acceleration sensor 67.

Figure 7:
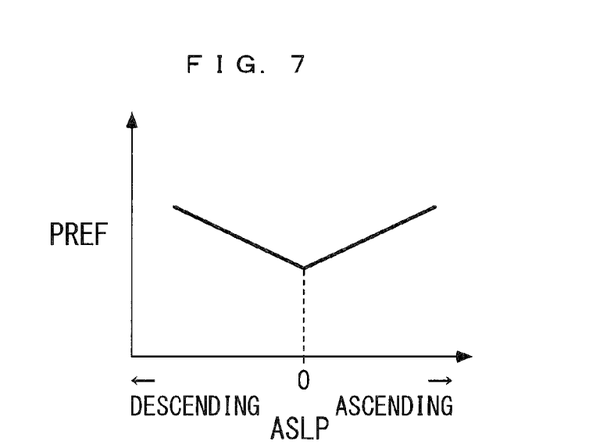
FIG. 7 A map for use in a predetermined pressure setting process performed in the FIG. 6 process.

Next, by searching a map shown in FIG. 7 according to the calculated road surface slope ASLP, a predetermined pressure PREF is calculated (step 23). In this map, the predetermined pressure PREF is set to the minimum value when the road surface slope ASLP is equal to 0, which means the road surface is level, and is set to a higher value as the slope is larger in both the cases of ascending slope and descending slope.

Next, it is determined whether or not the detected wheel cylinder pressure PWC is higher than the set predetermined pressure PREF (step 24). If the answer to the question of the step 24 is negative (NO), i.e. PWC≤PREF, the wheel cylinder pressure PWC is insufficient, and hence it is determined that the braking force of the vehicle V needs to be increased, and to indicate this fact, a braking force-increasing request flag F_BFREQ is set to 1 (step 25), followed by terminating the present process.

If the answer to the question of the step 24 is affirmative (YES), it is determined whether or not the vehicle speed VP is approximately equal to 0 (step 26). If the answer to the question of the step 26 is negative (NO), it means that the vehicle V is actually moving even slightly, it is determined that the braking force of the vehicle V needs to be increased to prevent the vehicle V from moving further, so that the process proceeds to the step 25, wherein the braking force-increasing request flag F_BFREQ is set to 1.

On the other hand, if the answer to the question of the step 26 is affirmative (YES), i.e. if "the wheel cylinder pressure PWC>the predetermined pressure PREF" holds and also the vehicle speed VP is approximately equal to 0, it is determined that the braking force of the vehicle V does not need to be increased, so that the braking force-increasing request flag F_BFREQ is set to 0 (step 27), followed by terminating the present process.

Next, a braking force control process for the vehicle V will be described with reference to FIG. 8. This process controls the braking force of the vehicle V during an idle stop and a restart of the engine 3, according to the result of the braking force-increasing necessity determination obtained from the FIG. 6 process, and is executed at predetermined time intervals.

In the present process, first, in a step 31, it is determined whether or not the idle stop flag F_IDLSTP is equal to 1. If the answer to the question of the step 31 is affirmative (YES), i.e. the engine 3 is in idle stop, the brake system 5 is controlled to the above-mentioned retention mode to retain the braking force of the vehicle V (step 33), followed by terminating the present process.

If the answer to the question of the step 31 is negative (NO), i.e. if the engine is not in idle stop, the process proceeds to a step 34, wherein it is determined whether or not the braking force-increasing request flag F_BFREQ is equal to 1. If the answer to the question of the step 34 is negative (NO), i.e. if it is determined that the braking force of the vehicle V does not need to be increased, the present process is immediately terminated.

On the other hand, if the answer to the question of the step 34 is affirmative (YES), i.e. if it is determined that the braking force of the vehicle V needs to be increased, it is determined whether or not the hydraulic pump operation flag F_BR is equal to 1 (step 35). If the answer to the question of the step 35 is negative (NO), i.e. if the hydraulic pump 55 has not been activated yet, after the hydraulic pump operation flag F_BR is set to 1 (step 36), and a pump operation time period TMBR that is counted with a timer of an up-count type is reset to 0 (step 37), the hydraulic motor 56 is driven to start the operation of the hydraulic pump 55 (step 38), followed by terminating the present process.

By thus operating the hydraulic pump 55 and controlling the hydraulic circuit 13 of the brake system 5 to the above-described pressurization mode, the brake fluid pressure pressurized by the hydraulic pump 55 is supplied to the wheel cylinder 16 via the hydraulic circuit 13, whereby the brake fluid pressure within the wheel cylinder 16 is increased to increase the braking force of the vehicle V.

If the answer to the question of the step 35 is affirmative (YES), i.e. the hydraulic pump 55 has already been activated, it is determined whether or not the pump operation time period TMBR is not shorter than a predetermined time period TBRREF (step 39). If the answer to the question of the step 39 is negative (NO), the process proceeds to the step 38 to continue the operation of the hydraulic pump 55. On the other hand, if the answer to the question of the step 39 is affirmative (YES), i.e. if the predetermined time period TBRREF has elapsed after starting the operation of the hydraulic pump 55, the hydraulic pump 55 is stopped (step 40), followed by terminating the present process.

Figure 9:
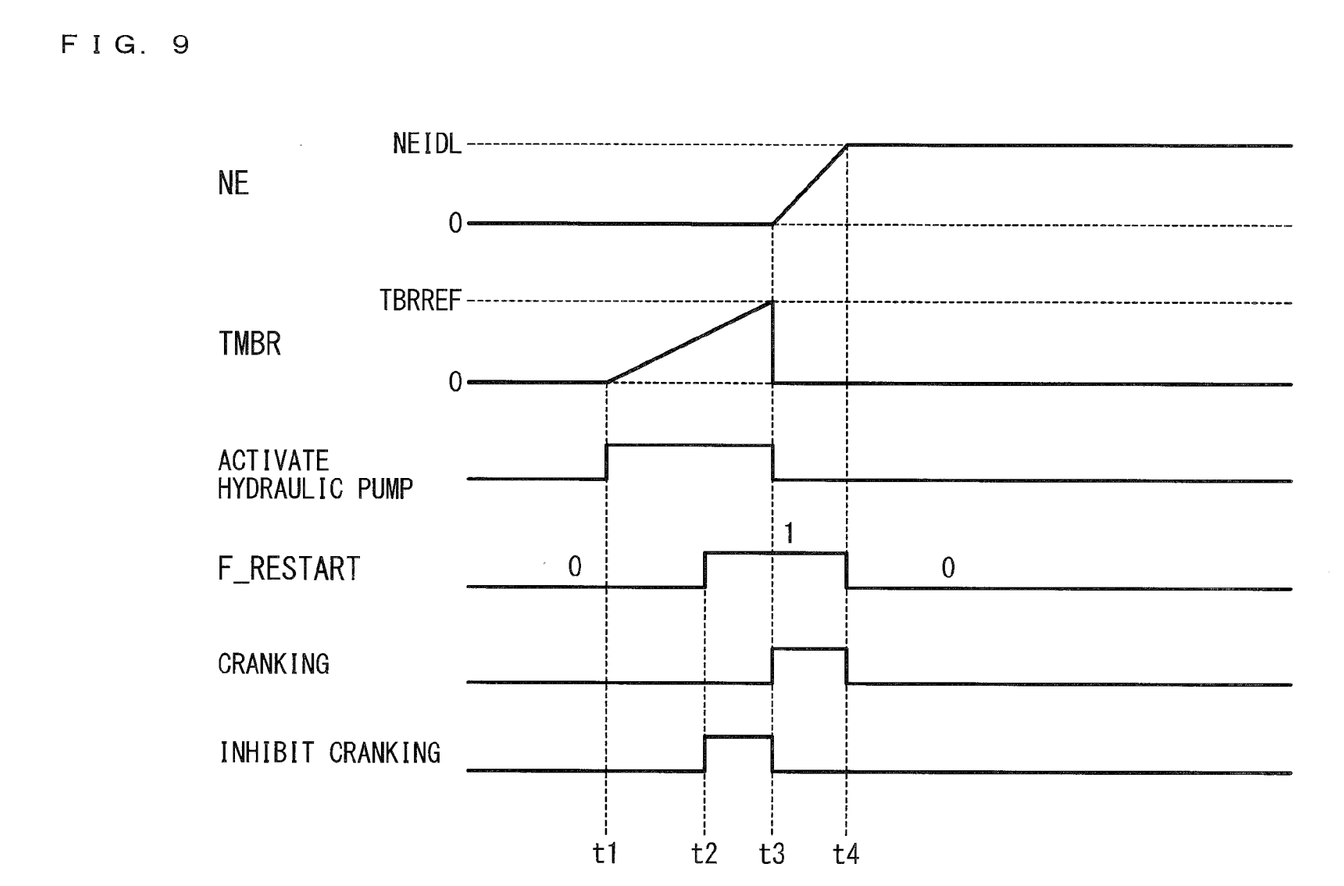
FIG. 9 A timing diagram showing an operation example obtained by the FIG. 8 process.

FIG. 9 shows an operation example obtained by the processes described heretofore, in a case where the restart conditions are satisfied during operation of the hydraulic pump 55. If it is determined that the braking force of the vehicle V needs to be increased during an idle stop (time point t1), in accordance therewith, the braking force-increasing request flag F_BFREQ is set to 1 (step 25 in FIG. 6), and at the same time the operation of the hydraulic pump 55 is started (steps 34, 38 in FIG. 8).

If the restart conditions of the engine 3 are satisfied during operation of the hydraulic pump 55 (time point t2), the restart flag F_RESTART is set to 1 (step 6 in FIG. 5). However, since the hydraulic pump 55 is in operation, the cranking is inhibited at this time point (steps 7 to 9).

Then, when the predetermined time period TBRREF elapses after starting the operation of the hydraulic pump 55 (time point t3), the operation of the hydraulic pump 55 is terminated (steps 39, 40 in FIG. 8), and the cranking-inhibited state is cancelled to start the cranking (steps 7, 10, 11 in FIG. 5).

Then, when the engine speed NE reaches the idle speed NEIDL (time point t4), the cranking is terminated at this time point (steps 14, 16 in FIG. 5), and it is determined that the restart of the engine 3 is completed, so that the restart flag F_RESTART is reset to 0, whereby thereafter the control shifts to normal control. Note that although not shown, in a case where the hydraulic pump 55 is not in operation when the restart conditions are satisfied, the cranking is not inhibited, but is started concurrently with satisfaction of the restart conditions (steps 7, 10, 11 in FIG. 5).

As described above, according to the present embodiment, if the restart conditions of the engine 3 from an idle stop state are satisfied during operation of the hydraulic pump 55 for use in increasing the braking force of the vehicle V, the cranking is inhibited to continue the operation of the hydraulic pump 55. This makes it possible to positively increase the braking force of the vehicle V by preventing the battery voltage VB from being lowered due to the cranking to ensure the stable operation of the hydraulic pump 55, and hence it is possible to positively prevent the vehicle V during a stop from moving.

Further, it is possible to ensure more stable operation of the hydraulic pump 55 by inhibiting the cranking until the operation of the hydraulic pump 55 is terminated, and it is possible to start the cranking as quickly as possible by starting the cranking when the operation of the hydraulic pump 55 is terminated, to thereby restart the engine 3 without any difficulty.

Further, the hydraulic pump 55 is stopped when the predetermined time period TBRREF has elapse after starting the operation of the hydraulic pump 55, and hence it is possible to more positively increase the braking force of the vehicle V by securing a sufficient operation time period thereof.

Further, although in the embodiment, the above-mentioned predetermined time period TBRREF is a fixed value, the predetermined time period TBRREF may be set according to the calculated road surface slope ASLP. In this case, e.g. similarly to the case of the predetermined pressure PREF shown in FIG. 7, the predetermined time period TBRREF is set to the minimum value when the road surface slope ASLP is equal to 0, i.e. the road surface is level, and is set to a larger value as the slope is larger. This makes it possible to further properly increase the braking force of the vehicle V by operating the hydraulic pump 55 for a longer time period as the mobility of the vehicle V is higher due to the influence of the road surface slope.

Further, since the hydraulic pump 55 is activated only in a case where it is determined that the braking force of the vehicle V needs to be increased, differently from the conventional system, it is possible to perform an efficient operation of the hydraulic pump 55 without wasting power, which in turn makes it possible to improve the fuel economy of the vehicle V.

Further, in the determination process in FIG. 6, it is determined that the braking force of the vehicle V needs to be increased by the hydraulic pump 55 when the wheel cylinder pressure PWC is lowered to not higher than the predetermined pressure PREF or when the vehicle speed VP is not equal to 0. Therefore, it is possible to effectively obtain the required braking force by properly operating the hydraulic pump 55 according to a lowered state of the actual wheel cylinder pressure PWC and a moving state of the vehicle V. Further, the above-mentioned predetermined pressure PREF is set according to the road surface slope ASLP, it is possible to properly operate the hydraulic pump 55 according to the mobility of the vehicle V.

Next, a braking force control process for the vehicle V according to a variation of the embodiment will be described with reference to FIG. 10. As is apparent from a comparison with FIG. 8, this variation is distinguished from the embodiment only in that processing in a step 39A is changed from that in the corresponding step 39 in FIG. 8, whereby the wheel cylinder pressure PWC is used as a reference for determining a stop timing of the hydraulic pump 55 instead of the pump operation time period TMBR of the embodiment.

More specifically, if the answer to the question of the step 35 is affirmative (YES), i.e. if the hydraulic pump 55 is in operation, in the step 39A, it is determined whether or not the wheel cylinder pressure PWC is not lower than a sum of the predetermined pressure PREF and a predetermined value ΔPH as a hysteresis (=PREF+ΔPH). If the answer to the question of the step 39A is negative (NO), the process proceeds to the step 38 to continue the operation of the hydraulic pump 55. On the other hand, if the answer to the question of the step 39A is affirmative (YES), i.e. PWC≥PREF+ΔPH holds, the hydraulic pump 55 is stopped (step 40).

Therefore, according to this variation, it is possible to stop the hydraulic pump 55 in a state where the wheel cylinder pressure PWC has actually and sufficiently recovered after activating the hydraulic pump 55, and hence it is possible to positively increase the braking force of the vehicle V, and efficiently operate the hydraulic pump 55.

Note that the present invention is by no means limited to the above-described embodiment, but can be practiced in various forms. For example, although in the above-described embodiment and variation thereof, the hydraulic pump 55 is used as a braking force-increasing device for increasing the braking force of the vehicle V, this may be replaced by the electric brake 20. In this case, it is possible to obtain the same advantageous effects as described above by controlling the activation and stop of the electric brake 20 in the same manner as in the above-described case of the hydraulic pump 55.

Further, although in the embodiments, each wheel W of the vehicle V is provided with the disc brake 14, with regard to the rear wheels WRL and WRR, instead of the disc brake, a drum brake may be used, and in this case, with regard to the electric brake as well, one for drum brake may be used.

Further, although in the embodiments, the present invention is applied to the gasoline engine installed on the vehicle, this is not limitative, but it can be applied to various engines other than the gasoline engine, e.g. a diesel engine, and further, it is possible to change details of the configuration of the embodiment within the spirit and scope of the present invention.

INDUSTRIAL APPLICABILITY

The present invention is very useful in positively increasing the braking force of the vehicle during an idle stop, and positively preventing the vehicle during stop from moving.

REFERENCE SIGNS LIST

2 ECU (braking force increasing necessity-determining means, control means, predetermined time period-setting means, predetermined pressure-setting means)
3 internal combustion engine
5 brake system
6 starter motor (cranking means)
7 battery (power source)
16 wheel cylinder
20 electric brake (braking force-increasing device)
55 hydraulic pump (braking force-increasing device)
62 wheel cylinder pressure sensor (wheel cylinder pressure-detecting means)
64 wheel speed sensor (vehicle speed-detecting means)
67 acceleration sensor (road surface slope-detecting means)
V vehicle
TBRREF predetermined time period
PWC wheel cylinder pressure (brake fluid pressure in the wheel cylinder)
PREF predetermined pressure
ASLP road surface slope (slope of road surface on which the vehicle is stopped)
VP vehicle speed

The invention claimed is:
1. A stop control system for a vehicle, for stopping an internal combustion engine installed on the vehicle having a brake system, when predetermined stop conditions are satisfied, restarting the engine when predetermined restart conditions are satisfied, and controlling a braking force of the vehicle such that the braking force is increased in order to supplement the braking force of the brake system during a stop of the vehicle, comprising:

cranking means for cranking the engine using power supplied from a predetermined power source when the restart conditions are satisfied;

a braking force-increasing device that is driven by power supplied from the power source, for increasing the braking force of the vehicle;

braking force increasing necessity-determining means for determining whether or not the braking force of the vehicle needs to be increased by said braking force-increasing device during a stop of the engine; and control means for causing said braking force-increasing device to operate, when it is determined that the braking force of the vehicle needs to be increased, wherein said control means inhibits the cranking until the operation of said braking force-increasing device is terminated, when the restart conditions are satisfied during operation of said braking force-increasing device.

2. The stop control system according to claim 1, wherein said control means causes the cranking to be started when the operation of said braking force-increasing device is terminated.

3. The stop control system according to claim 1, wherein said control means stops said braking force-increasing device when a predetermined time period elapses after starting the operation of said braking force-increasing device.

4. The stop control system according to claim 3, further comprising:

road surface slope-detecting means for detecting a slope of a road surface on which the vehicle is stopped; and predetermined time period-setting means for setting the predetermined time period according to the detected slope of the road surface.

5. The stop control system according to claim 1, wherein the brake system is configured to brake the vehicle by brake fluid pressure that is supplied to a wheel cylinder, the stop control system further comprising wheel cylinder pressure-detecting means for detecting the brake fluid pressure in the wheel cylinder, and wherein said braking force increasing necessity-determining means determines that the braking force needs to be increased by said braking force-increasing device when the detected brake fluid pressure in the wheel cylinder has lowered to not higher than a predetermined pressure.

6. The stop control system according to claim 5, wherein said control means stops said braking force-increasing device when the brake fluid pressure in the wheel cylinder exceeds the predetermined pressure after activating said braking force-increasing device.

7. The stop control system according to claim 5, further comprising:

road surface slope-detecting means for detecting a slope of a road surface on which the vehicle is stopped; and predetermined pressure-setting means for setting a predetermined pressure according to the detected slope of the road surface.

8. The stop control system according to claim 1, further comprising:

vehicle speed-detecting means for detecting a speed of the vehicle, and wherein said braking force increasing necessity-determining means determines that the braking force needs to be increased by said braking force-increasing device, when the detected speed of the vehicle is not equal to 0.

9. A stop control system for a vehicle, for stopping an internal combustion engine installed on the vehicle having a brake system, when predetermined stop conditions are satisfied, restarting the engine when predetermined restart conditions are satisfied, and controlling a braking force of the vehicle such that the braking force is increased in order to supplement the braking force of the brake system during a stop of the vehicle, the stop control system comprising:

a starter motor configured to crank the engine using power supplied from a predetermined power source when the restart conditions are satisfied;

a braking force-increasing device that is driven by power supplied from the power source, for increasing the braking force of the vehicle; and an electronic control unit programmed to:
determine whether or not the braking force of the vehicle needs to be increased by said braking force-increasing device during a stop of the engine; and
cause said braking force-increasing device to operate, when it is determined that the braking force of the vehicle needs to be increased, wherein said electronic control unit inhibits the cranking until the operation of said braking force-increasing device is terminated, when the restart conditions are satisfied during operation of said braking force-increasing device.

10. The stop control system according to claim 9, wherein said electronic control unit is programmed to cause the cranking to be started when the operation of said braking force-increasing device is terminated.

11. The stop control system according to claim 9, wherein said electronic control unit is programmed to stop said braking force-increasing device when a predetermined time period elapses after starting the operation of said braking force-increasing device.

12. The stop control system according to claim 11, further comprising:

an acceleration sensor configured to detect a slope of a road surface on which the vehicle is stopped, wherein the electronic control unit is programmed to set the predetermined time period according to the detected slope of the road surface.

13. The stop control system according to claim 9, wherein the brake system is configured to brake the vehicle by brake fluid pressure that is supplied to a wheel cylinder, the stop control system further comprising:

a pressure sensor configured to detect the brake fluid pressure in the wheel cylinder, wherein said electronic control unit is programmed to determine that the braking force needs to be increased by said braking force-increasing device when the detected brake fluid pressure in the wheel cylinder has lowered to not higher than a predetermined pressure.

14. The stop control system according to claim 13, wherein said electronic control unit is programmed to stop said braking force-increasing device when the brake fluid pressure in the wheel cylinder exceeds the predetermined pressure after activating said braking force-increasing device.

15. The stop control system according to claim 13, further comprising:

an acceleration sensor configured to detect a slope of a road surface on which the vehicle is stopped, wherein the electronic control unit is programmed to set the predetermined time period according to the detected slope of the road surface.

16. The stop control system according to claim 9, further comprising:
a wheel speed sensor configured to detect a speed of the vehicle,
wherein said electronic control unit is programmed to determine that the braking force needs to be increased by said braking force-increasing device, when the detected speed of the vehicle is not equal to 0.

* * * * *